(12) United States Patent
Naglatzki et al.

(10) Patent No.: US 11,345,191 B2
(45) Date of Patent: May 31, 2022

(54) PNEUMATIC VEHICLE TYRE

(71) Applicant: Continental Reifen Deutschland GmbH, Hannover (DE)

(72) Inventors: Paul Naglatzki, Hannover (DE); Florian Kristen, Hannover (DE); Christian Meiners, Hannover (DE); Frank Lippert, Lehrte (DE)

(73) Assignee: Continental Reifen Deutschland GmbH, Hannover (DE)

( * ) Notice: Subject to any disclaimer, the term of this patent is extended or adjusted under 35 U.S.C. 154(b) by 364 days.

(21) Appl. No.: 16/487,847

(22) PCT Filed: Jan. 15, 2018

(86) PCT No.: PCT/EP2018/050804
§ 371 (c)(1),
(2) Date: Aug. 22, 2019

(87) PCT Pub. No.: WO2018/153570
PCT Pub. Date: Aug. 30, 2018

(65) Prior Publication Data
US 2021/0129593 A1    May 6, 2021

(30) Foreign Application Priority Data
Feb. 24, 2017 (DE) ..................... 10 2017 203 011.9

(51) Int. Cl.
*B60C 11/13* (2006.01)
*B60C 11/03* (2006.01)

(52) U.S. Cl.
CPC ... *B60C 11/1323* (2013.01); *B60C 2011/0353* (2013.01); *B60C 2011/0355* (2013.01); *B60C 2011/133* (2013.01); *B60C 2200/06* (2013.01)

(58) Field of Classification Search
CPC .......... B60C 2011/133; B60C 11/1323; B60C 11/1376; B60C 11/1392; B60C 11/13;
(Continued)

(56) References Cited

U.S. PATENT DOCUMENTS 5,031,680 A * 7/1991 Kajikawa ................ B60C 11/14
152/209.18
2008/0121325 A1* 5/2008 Durand ................... B60C 11/13
152/209.18
(Continued)

FOREIGN PATENT DOCUMENTS

CN    101811420 A    8/2010
DE    102010001898 A1    9/2010
(Continued)

OTHER PUBLICATIONS

JP 2011131865 Machine Translation; Saeki, Kentaro (Year: 2011).*
(Continued)

*Primary Examiner* — Robert C Dye
*Assistant Examiner* — Nicholas J Weiler
(74) *Attorney, Agent, or Firm* — Gregory Adams; David L. Cate

(57) ABSTRACT

A pneumatic vehicle tire, in particular commercial vehicle tire, having a tread having in each case one shoulder-side profile rib (1) which is separated in each case from a central tread portion (3) by a wide circumferential groove (2) which is made to profile depth (T) and which runs around rectilinearly in the circumferential direction, wherein the circumferential groove (2) has a rounded groove base (8) and is delimited at the profile rib (1) by a rib flank (6). Recesses (9) are formed on the rib flank (6) of the circumferential groove (3) at the profile rib periphery, which recesses have, in the direction of extent of the circumferential groove (2), a length of extent (1) of 70% to 90% of the profile depth (T), at most of 30 mm, and in each case have, as seen in plan view, boundary surfaces (10a, 10b) which run toward one another in an L shape and extend in the radial direction, and a bottom surface (11), wherein, as seen in plan view, the one first boundary surface (10a) runs into the profile rib (1) at an angle (β) of up to 35° to the axial direction, and the second
(Continued)

Figure 1:
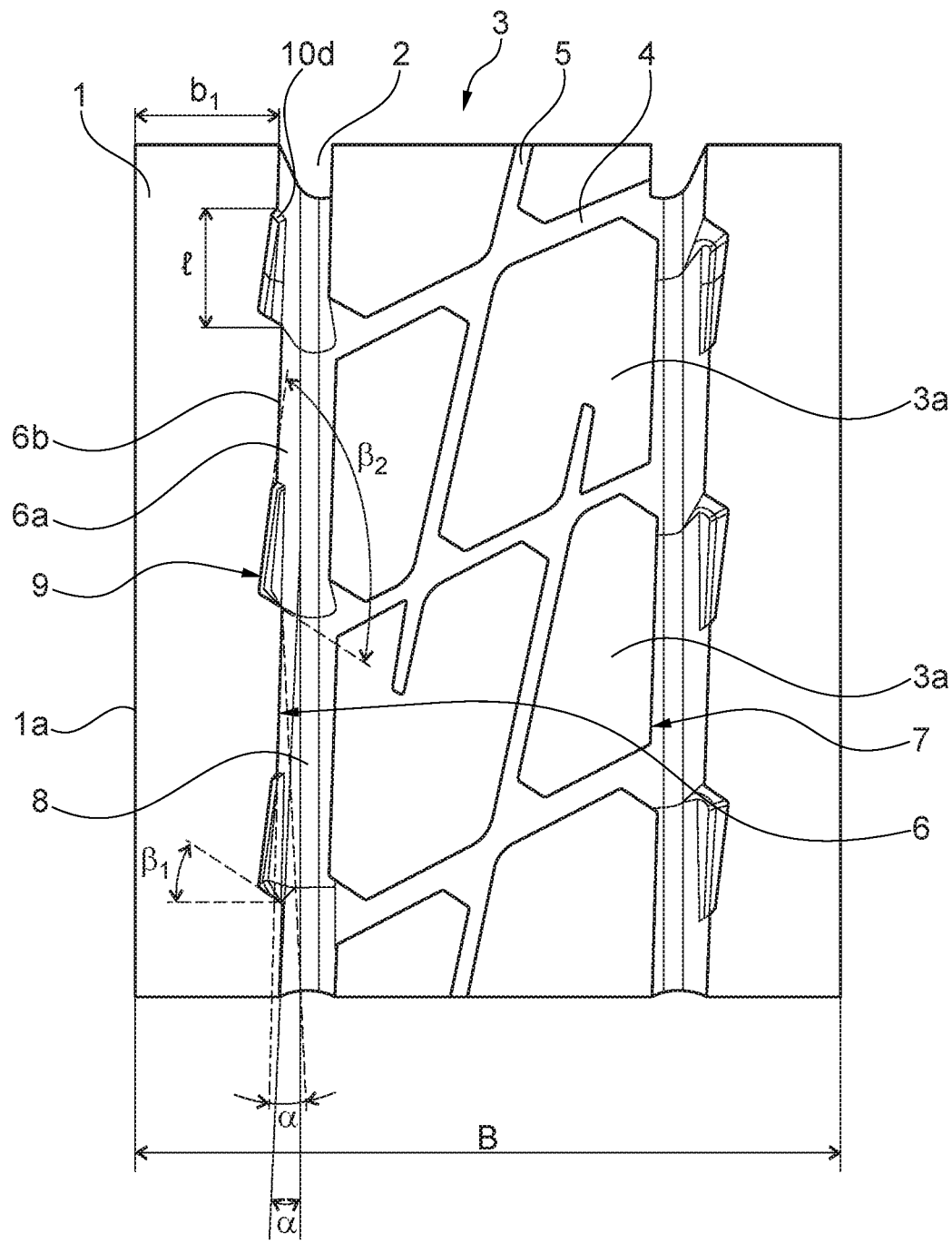

boundary surface (10b) runs at an angle ($\beta_2$) of 90° to 125° to the first-mentioned boundary surface (10a), and wherein bottom surface (11) is situated at a depth (t) of 15% to 25% of the profile depth (T).

14 Claims, 2 Drawing Sheets

(58) Field of Classification Search
CPC ............ B60C 11/0306; B60C 11/1307; B60C 2200/06; B60C 11/045; B60C 11/0318; B60C 2011/0381
See application file for complete search history.

(56) References Cited

U.S. PATENT DOCUMENTS

| | | |
|---|---|---|
| 2009/0218016 A1 | 9/2009 | Ducci |
| 2009/0272473 A1 | 11/2009 | Kojima |
| 2009/0320982 A1 | 12/2009 | Ochi |
| 2012/0103492 A1 | 5/2012 | Knispel |
| 2014/0367013 A1 | 12/2014 | Chambriard et al. |
| 2018/0147891 A1* | 5/2018 | Takahashi ........... B60C 11/0306 |

FOREIGN PATENT DOCUMENTS

| | | | |
|---|---|---|---|
| DE | 102011076813 A1 | | 12/2011 |
| EP | 1950060 A1 | | 7/2008 |
| EP | 2447092 A1 | | 5/2012 |
| EP | 2666648 A1 | | 11/2013 |
| JP | S5675004 U | | 6/1981 |
| JP | 2011131865 A | * | 7/2011 |
| WO | 2007/099085 A1 | | 9/2007 |

OTHER PUBLICATIONS

International Search Report dated Apr. 24, 2018 of international application PCT/EP2018/050804 on which this application is based.

* cited by examiner

PNEUMATIC VEHICLE TYRE

The invention relates to a pneumatic vehicle tire, in particular a commercial vehicle tire, having a tread having in each case one shoulder-side profile rib which is separated in each case from a central tread portion by a wide circumferential groove which is made to profile depth and which runs around rectilinearly in the circumferential direction, wherein the circumferential groove has a rounded groove base and is delimited at the profile rib by a rib flank.

Commercial vehicle tires having such profile configurations are known in different variants. In the central tread region there can run further circumferential grooves which separate profile ribs from one another. The central tread region can also be structured with a block structure, for example with two or three block rows; a combination of profile ribs and blocks can also be provided in the central tread region. Commercial vehicle tires with treads configured in this way have proved themselves particularly at trailing axle positions of commercial vehicles or at positions of commercial vehicles at which relatively low lateral movements occur. A certain disadvantage of treads configured with such circumferential orientation having profile ribs on tire shoulders and having wide circumferential grooves adjoining said ribs is the low traction on account of non-present engagement edges.

The object on which the invention is based is to take constructional measures by means of which the traction performance of a tire having a tread with profile ribs in the shoulder regions can be improved.

The object set is achieved according to the invention in that recesses are formed on the rib flank of the circumferential groove at the profile rib periphery, which recesses have, in the direction of extent of the circumferential groove, a length of extent of 70% to 90% of the profile depth, at most of 30 mm, and in each case have, as seen in plan view, boundary surfaces which run toward one another in an L shape and extend in the radial direction, and a bottom surface, wherein, as seen in plan view, the one boundary surface runs into the profile rib at an angle of up to 10° to the axial direction, and the second boundary surface runs at an angle of 90° to 120° to the first-mentioned boundary surface, and wherein the bottom surface is situated at a depth of 15% to 25% of the profile depth.

Particularly the boundary surfaces of the recesses that run in the axial direction make available very effective traction edges at the profile rib periphery. The second boundary surfaces running roughly in the circumferential direction and the bottom surfaces situated at a relatively low depth simultaneously provide the profile ribs with good stabilization, thereby largely avoiding the occurrence of tears in the region of the recesses.

In a preferred embodiment of the invention, in the circumferential direction, the rib flank is composed of flank portions which run at an acute angle of 1° to 3° to the circumferential direction, wherein the flank portions are connected to one another via setbacks which are each concomitantly formed by the first boundary surface of the recesses. An advantageous effect of these flank portions running at a small acute angle to the circumferential direction is their contribution to traction.

A further advantage of these flank portions connected via setbacks consists in the fact that the first boundary surface is formed in the radial direction along the setback as an elongate triangular surface to the start of the groove base. Even with relatively large abrasion of the tread, there therefore always remains present a traction edge in the region of the setback.

In pneumatic vehicle tires which have, in the central tread region, profile blocks which are designed according to a method of pitch length variation and correspondingly follow one another in the circumferential direction, each pitch can be assigned a flank portion of the rib flank. This arrangement of the flank portions according to the pitch length variation provided in the central tread region is also advantageous for the tire/road noise.

In a further embodiment variant of the invention, a narrow transition surface running in the radial direction is present between the rib flank and the second boundary surface. This transition surface runs, as seen in plan view, in the axial direction or at an acute angle to the axial direction and has a width of at least 1.0 mm, in particular of 1.0 mm to 3.0 mm, in the axial direction. This narrow transition surface is advantageous for the stability of the rib flank in this region.

Figure 2:
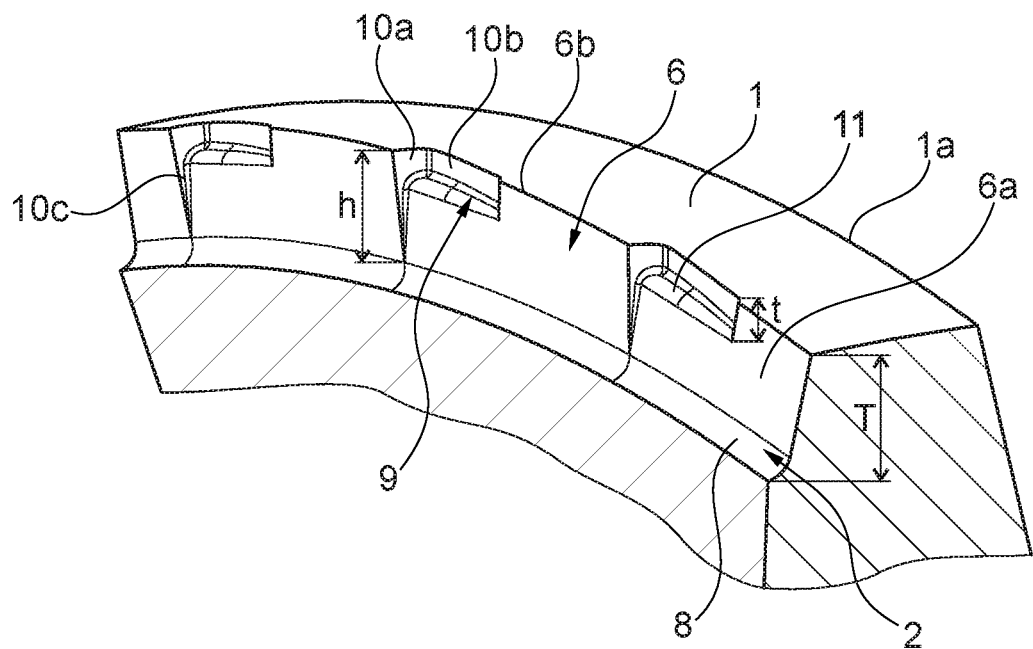
Figure 3:
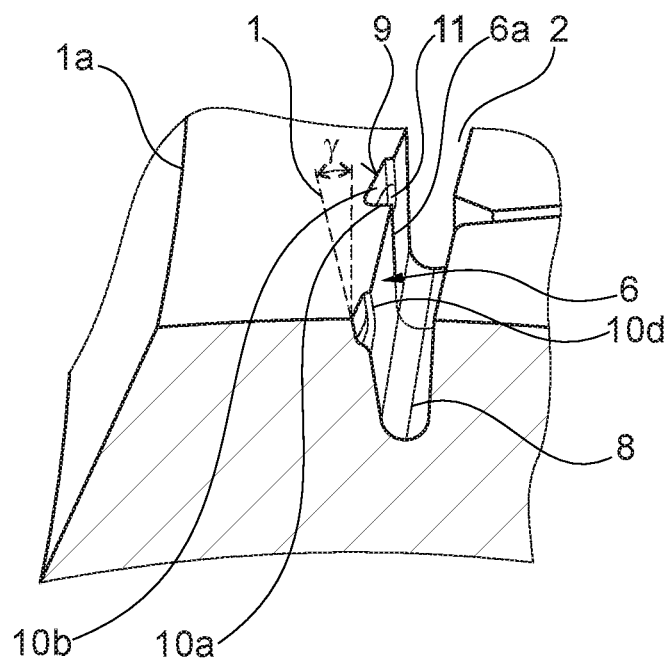

Further features, advantages and details of the invention will now be described in more detail on the basis of the drawing, which illustrates an exemplary embodiment and in which FIG. 1 shows a plan view of a circumferential portion of an exemplary embodiment of a tread of a pneumatic vehicle tire according to the invention, FIG. 2 shows a view of a circumferential portion of a profile rib flank, and FIG. 3 shows a front view of a circumferential portion of a circumferential groove with a view of the profile rib flank.

Pneumatic vehicle tires embodied according to the invention are in particular off-road tires or commercial vehicle tires for a wide variety of intended uses, preferably large-size commercial vehicle tires for rim diameters of at least 24 inches. Such tires are for example tires for straddle carriers, reach stackers or container stackers. Tires embodied according to the invention have a one- or multi-ply carcass, either in the form of a radial carcass or of a diagonal carcass, and a multi-ply belt assembly or a plurality of breaker plies.

The profiled tread shown in the figures has, on the shoulder side, in each case one profile rib 1, said profile ribs being in each case separated from a central tread region 3 by a wide circumferential groove 2 which runs round in the circumferential direction. The profile ribs 1 have no or largely no profile structures, such as transverse grooves or sipes, and have a width $b_1$ of 20% to 30% of the ground contact patch width B. Here, the ground contact patch width B corresponds to the spacing, determined in the axial direction, between the two outer marginal edges 1a of the profile ribs 1.

In the embodiment illustrated, the tread has, in the central tread portion 3, a block structure with profile blocks 3a which are separated from one another by transverse grooves 4 and by oblique grooves 5 which run at a small acute angle to the circumferential direction. Since the block structure in the central tread region 3 does not form the subject matter of the invention, the configuration thereof will not be discussed in detail. The central tread portion 3 is designed according to a method of pitch length variation, wherein each pitch comprises a pair of the profile blocks 3a, which are situated next to one another, in the central tread portion 3 together with in each case one of the transverse grooves 4 adjoining them in the circumferential direction. As is known per se and customary, such pitches are provided in different circumferential lengths, for example in two to three different circumferential lengths, in order in this way to favorably influence or to reduce the tire/road noise.

At least the circumferential grooves 2 have a depth which corresponds to the provided profile depth T (FIG. 2), which, in the case of commercial vehicle tires, depending on their tire dimension and intended use, can vary within a wide range, for example can amount to 12 mm to 95 mm.

As FIG. 3 shows for example, each circumferential groove 2 is delimited at the profile rib 1 by a rib flank 6 and, opposite the rib flank 6, by block flanks 7 which follow one another in the circumferential direction. The rib flank 6 and the block flanks 7 are connected to one another via a groove base 8 which, in the embodiment shown, and as is customary in circumferential grooves, is of rounded configuration. In the embodiment shown, in the circumferential direction, the rib flank 6 is also composed of flank portions 6a whose marginal edges 6b run with respect to the circumferential direction at an acute angle α of 1° to 3° which is at least largely equal for all flank portions 6a. In the embodiment shown, each pitch in the central tread region 3 is assigned a flank portion 6a. As seen in plan view, the tread-inner end points of the flank portions 6a each lie on the same straight line running around in the circumferential direction. The same analogously applies to the tread-outer end points of the flank portions 6a. Between the flank portions 6a which follow one another in the circumferential direction there is therefore present a small nose or a short setback in the marginal edges 6b.

Recesses 9 which are L-shaped when seen in plan view and which project into the profile rib 1 are formed on each rib flank 6 at the profile rib periphery. The recesses 9 are situated on the end portions of the flank portions 6a and therefore end at the setbacks. The main boundary surfaces of each recess 9 are boundary surfaces 10a, 10b which run along the L, and a bottom surface 11 which, as seen in plan view, substantially has the shape of an elongate triangle. The boundary surface 10a runs, while concomitantly forming the setback, starting from the rib flank 6, as seen in plan view, at an angle $\beta_1$ of 0° to 35° to the axial direction, and the boundary surface 10b, which adjoins the boundary surface 10a, runs at an angle $\beta_2$ to the boundary surface 10a which is 90° to 125°. The boundary surface 10b ends at a narrow transition surface 10d to the rib flank 6. The two boundary surfaces 10a, 10b also run in the radial direction or with respect to the radial direction at a small acute angle γ (FIG. 3) of up to 10°. The transition surface 10d runs in the radial direction to the bottom surface 11, in plan view in the axial direction and has a width of a few mm, in particular 1.0 mm to 3.0 mm, in the axial direction. The length of extent l (FIG. 1) of the recess 9 on the tread periphery is 70% to 90% of the profile depth T, but at most 30 mm. The bottom surface 11 is situated at a depth t (FIG. 2) of 15% to 25% of the profile depth T and merges into the boundary surfaces 10a, 10b via transition roundings. Furthermore, in the preferred embodiment shown, the inner corner between the two boundary surfaces 10a, 10b is also of rounded configuration.

At the setback between the flank portions 6a, the boundary surface 10a is continued in the radial direction as an elongate narrow triangular surface 10c (FIG. 2) to the groove base 8. The height h (FIG. 2), which is determined in the radial direction, between the acute-angled end of the triangular surface 10c and the profile rib periphery is therefore 70% to 90% of the profile depth T.

In an alternative embodiment of the invention, the profile rib 1 is configured with a continuous rib flank 6 such that the marginal edge of the rib flank 6 at the profile rib periphery 1a extends continuously and rectilinearly in the circumferential direction. Recesses configured according to the invention are then formed only by the two boundary surfaces 10a, 10b and the bottom surface 11.

LIST OF REFERENCE SIGNS

1 . . . Profile rib
1a . . . Marginal edge
2 . . . Circumferential groove
3 . . . Tread portion
3a . . . Profile block
4 . . . Transverse groove
5 . . . Oblique groove
6 . . . p Rib flank
6a . . . Flank portion
6b . . . Marginal edge
7 . . . Block flank
8 . . . Groove base
9 . . . Recess
10a, 10b . . . Boundary surface
10c . . . Triangular surface
10d . . . Transition surface
11 . . . Bottom surface
B . . . Ground contact patch width
T . . . Profile depth
$b_1$ . . . Width
h . . . Height
l . . . Length
t . . . Depth
α, $\beta_1$, $\beta_2$ . . . Angle

The invention claimed is:

1. A pneumatic vehicle tire having a tread comprising a shoulder-side profile rib separated from a central tread portion by a circumferential groove which is made to a profile depth and runs around rectilinearly in the circumferential direction, the circumferential groove has a rounded groove base and is delimited at the profile rib by a rib flank;
recesses are formed on the rib flank of the circumferential groove at a periphery of the profile rib, wherein the recesses have, in the direction of extent of the circumferential groove, a length of extent of from 70% to 90% of the profile depth, and at most of 30 mm, boundary surfaces which run toward one another in an L shape and extend in a radial direction, and a bottom surface;
a first boundary surface of the boundary surfaces runs into the profile rib at an angle ($\beta_1$) of up to 35° to the axial direction, and a second boundary surface of the boundary surfaces runs at an angle ($\beta_2$) of from 90° to 125° to the first boundary surface, and wherein the bottom surface is situated at a depth of from 15% to 25% of the profile depth;
in the circumferential direction, the rib flank is composed of flank portions which run at an acute angle (α) of from 1° to 3° to the circumferential direction, and the flank portions are connected to one another via setbacks which are each concomitantly formed by the first boundary surface of the recesses.

2. The pneumatic vehicle tire as claimed in claim 1, wherein the first boundary surface is continued in the radial direction along the setback as an elongate triangular surface to the start of the groove base.

3. The pneumatic vehicle tire as claimed in claim 1, wherein in the central tread portion profile, blocks which are formed according to a method of pitch length variation follow one another in the circumferential direction, and wherein each pitch is assigned a flank portion of the rib flank.

4. The pneumatic vehicle tire as claimed in claim 1, wherein the pneumatic vehicle tire is a commercial vehicle tire.

5. A pneumatic vehicle tire having a tread comprising a shoulder-side profile rib which is separated from a central tread portion by a circumferential groove which is made to a profile depth and which runs around rectilinearly in the circumferential direction, the circumferential groove has a rounded groove base and is delimited at the profile rib by a rib flank;
- recesses are formed on the rib flank of the circumferential groove at a periphery of the profile rib, wherein the recesses have, in the direction of extent of the circumferential groove, a length of extent of from 70% to 90% of the profile depth, and at most of 30 mm, and have boundary surfaces which run toward one another in an L shape and extend in a radial direction, and a bottom surface;
- a first boundary surface of the boundary surfaces runs into the profile rib at an angle ($\beta_1$) of up to 35° to the axial direction, and a second boundary surface of the boundary surfaces runs at an angle ($\beta_2$) of from 90° to 125° to the first boundary surface, and wherein the bottom surface is situated at a depth of from 15% to 25% of the profile depth;
- a transition surface running in the radial direction is present between the rib flank and the second boundary surface, wherein the transition surface, as seen in plan view, runs in the axial direction, and wherein the transition surface has a width of at least 1.0 mm in the axial direction; and
- the first boundary surface is continued in the radial direction along the setback as an elongate triangular surface to the start of the groove base.

6. The pneumatic vehicle tire as claimed in claim 5, wherein the transition surface has a width of from 1.0 mm to 4.0 mm in the axial direction.

7. The pneumatic vehicle tire as claimed in claim 5, wherein in the central tread portion profile, blocks which are formed according to a method of pitch length variation follow one another in the circumferential direction, and wherein each pitch is assigned a flank portion of the rib flank.

8. The pneumatic vehicle tire as claimed in claim 5, wherein the pneumatic vehicle tire is a commercial vehicle tire.

9. A pneumatic vehicle tire having a tread comprising a shoulder-side profile rib which is separated from a central tread portion by a circumferential groove which is made to a profile depth and which runs around rectilinearly in the circumferential direction, the circumferential groove has a rounded groove base and is delimited at the profile rib by a rib flank;
- recesses are formed on the rib flank of the circumferential groove at a periphery of the profile rib, wherein the recesses have, in the direction of extent of the circumferential groove, a length of extent of from 70% to 90% of the profile depth, and at most of 30 mm, and have boundary surfaces which run toward one another in an L shape and extend in a radial direction, and a bottom surface;
- a first boundary surface of the boundary surfaces runs into the profile rib at an angle ($\beta_1$) of up to 35° to the axial direction, and a second boundary surface of the boundary surfaces runs at an angle ($\beta_2$) of from 90° to 125° to the first boundary surface, and wherein the bottom surface is situated at a depth of from 15% to 25% of the profile depth;
- a transition surface running in the radial direction is present between the rib flank and the second boundary surface, wherein the transition surface, as seen in plan view, runs in the axial direction, and wherein the transition surface has a width of at least 1.0 mm in the axial direction; and
- in the circumferential direction, the rib flank is composed of flank portions which run at an acute angle ($\alpha$) of from 1° to 3° to the circumferential direction, and wherein the flank portions are connected to one another via setbacks which are each concomitantly formed by the first boundary surface of the recesses.

10. A pneumatic vehicle tire having a tread comprising a shoulder-side profile rib which is separated from a central tread portion by a circumferential groove which is made to a profile depth and which runs around rectilinearly in the circumferential direction, wherein the circumferential groove has a rounded groove base and is delimited at the profile rib by a rib flank;
- recesses are formed on the rib flank of the circumferential groove at a periphery of the profile rib, wherein the recesses have, in the direction of extent of the circumferential groove, a length of extent of from 70% to 90% of the profile depth, and at most of 30 mm, and have boundary surfaces which run toward one another in an L shape and extend in a radial direction, and a bottom surface;
- a first boundary surface of the boundary surfaces runs into the profile rib at an angle ($\beta_1$) of up to 35° to the axial direction, and a second boundary surface of the boundary surfaces runs at an angle ($\beta_2$) of from 90° to 125° to the first boundary surface, and wherein the bottom surface is situated at a depth of from 15% to 25% of the profile depth; and,
- a transition surface running in the radial direction is present between the rib flank and the second boundary surface, wherein the transition surface, as seen in plan view, runs at an acute angle of up to 45° to the axial direction, and wherein the transition surface has a width of at least 1.0 mm in the axial direction; and
- the first boundary surface is continued in the radial direction along the setback as an elongate triangular surface to the start of the groove base.

11. The pneumatic vehicle tire as claimed in claim 10, wherein the transition surface has a width of from 1.0 mm to 4.0 mm in the axial direction.

12. The pneumatic vehicle tire as claimed in claim 10, wherein in the central tread portion profile, blocks which are formed according to a method of pitch length variation follow one another in the circumferential direction, and wherein each pitch is assigned a flank portion of the rib flank.

13. The pneumatic vehicle tire as claimed in claim 10, wherein the pneumatic vehicle tire is a commercial vehicle tire.

14. A pneumatic vehicle tire having a tread comprising a shoulder-side profile rib which is separated from a central tread portion by a circumferential groove which is made to a profile depth and which runs around rectilinearly in the circumferential direction, wherein the circumferential groove has a rounded groove base and is delimited at the profile rib by a rib flank;
- recesses are formed on the rib flank of the circumferential groove at a periphery of the profile rib, wherein the recesses have, in the direction of extent of the circumferential groove, a length of extent of from 70% to 90% of the profile depth, and at most of 30 mm, and have boundary surfaces which run toward one another in an L shape and extend in a radial direction, and a bottom surface;

a first boundary surface of the boundary surfaces runs into the profile rib at an angle ($\beta_1$) of up to 35° to the axial direction, and a second boundary surface of the boundary surfaces runs at an angle ($\beta_2$) of from 90° to 125° to the first boundary surface, and wherein the bottom surface is situated at a depth of from 15% to 25% of the profile depth;

a transition surface running in the radial direction is present between the rib flank and the second boundary surface, wherein the transition surface, as seen in plan view, runs at an acute angle of up to 45° to the axial direction, and wherein the transition surface has a width of at least 1.0 mm in the axial direction; and in the circumferential direction, the rib flank is composed of flank portions which run at an acute angle ($\alpha$) of from 1° to 3° to the circumferential direction, and wherein the flank portions are connected to one another via setbacks which are each concomitantly formed by the first boundary surface of the recesses.

* * * * *